United States Patent [19] [11] 3,744,338
Komatsu et al. [45] July 10, 1973

[54] ENERGY ABSORBING STEERING DEVICE
[75] Inventors: Noboru Komatsu; Toshio Kurauchi, both of Nagoya, Japan
[73] Assignee: Kabushiki Kaisha Toyota Chuo Kenkyusho, Aichi-ken, Japan
[22] Filed: Oct. 27, 1971
[21] Appl. No.: 193,006

[30] Foreign Application Priority Data
Oct. 31, 1970 Japan................................ 45/96014

[52] U.S. Cl. .................................. 74/492, 188/1 C
[51] Int. Cl. ............................................. B62d 1/18
[58] Field of Search............................ 74/492, 493; 280/150 B, 87 A; 180/78; 188/1 C

[56] References Cited
UNITED STATES PATENTS
3,454,397 7/1969 Yoshioka et al...................... 74/492
2,997,325 8/1961 Peterson ........................ 74/492 UX
3,373,629 3/1968 Wight et al. .......................... 74/492
3,461,740 8/1969 Tajima et al.......................... 74/492

Primary Examiner—Milton Kaufman
Attorney—Alex Friedman, Lawrence Rosenthal et al

[57] ABSTRACT

An energy absorbing steering device for protecting vehicle drivers from the shock of impact against a steering wheel. Said device is provided with upper and lower steering shaft assemblies mounted for relative axial displacement in response to the application of axial forces, and a rigid plastic foam body. One of said assemblies includes a cylinder member having one open end and a bottom plate and the other includes a piston having a pushing surface inclined relative to the axis of said cylinder. The rigid plastic foam is disposed in the cylinder intermediate the inclined pushing surface and the bottom plate for compression upon such relative axial displacement of said assemblies. Said rigid plastic foam body has the property of relatively long and stable compressibility without spring back so that the kinetic energy of the driver's impact against the steering wheel is absorbed thereby at a predetermined load level.

24 Claims, 14 Drawing Figures

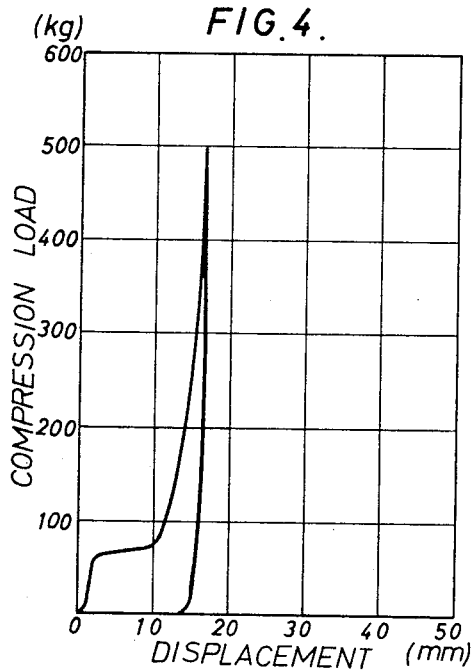
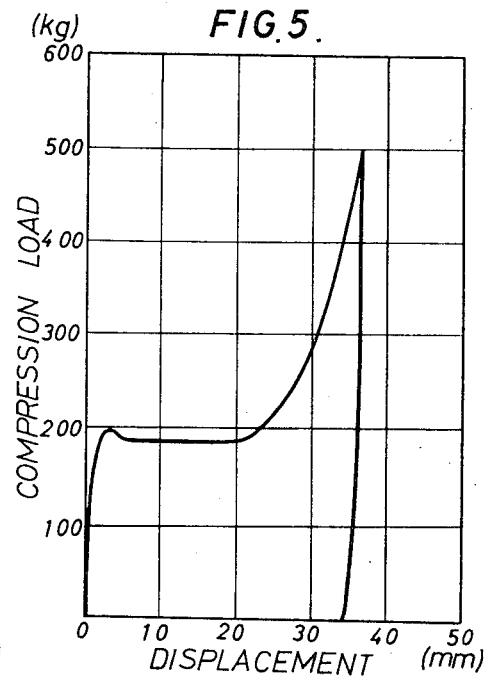
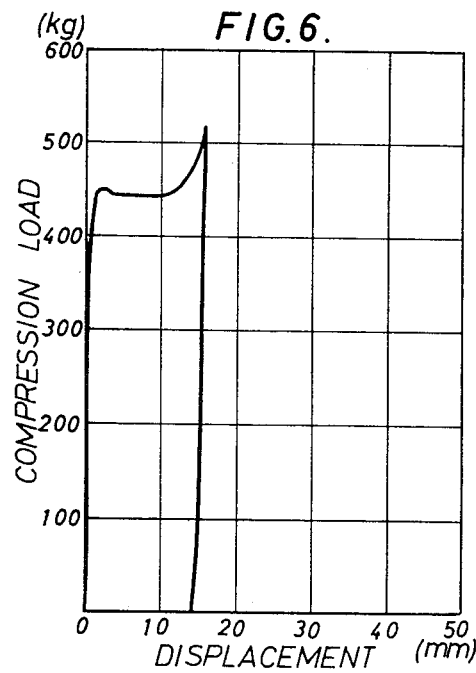
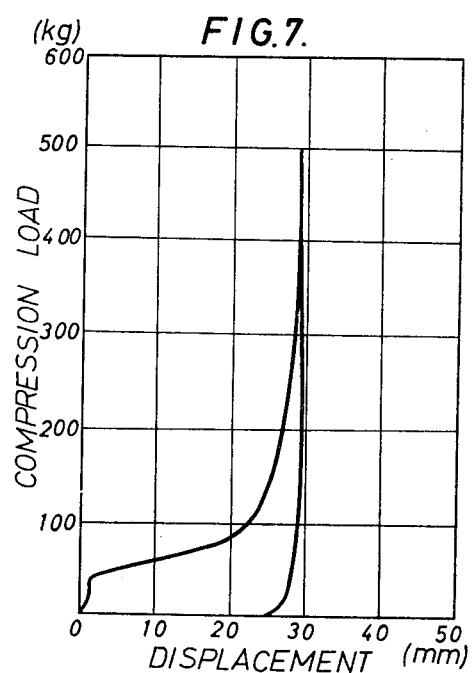

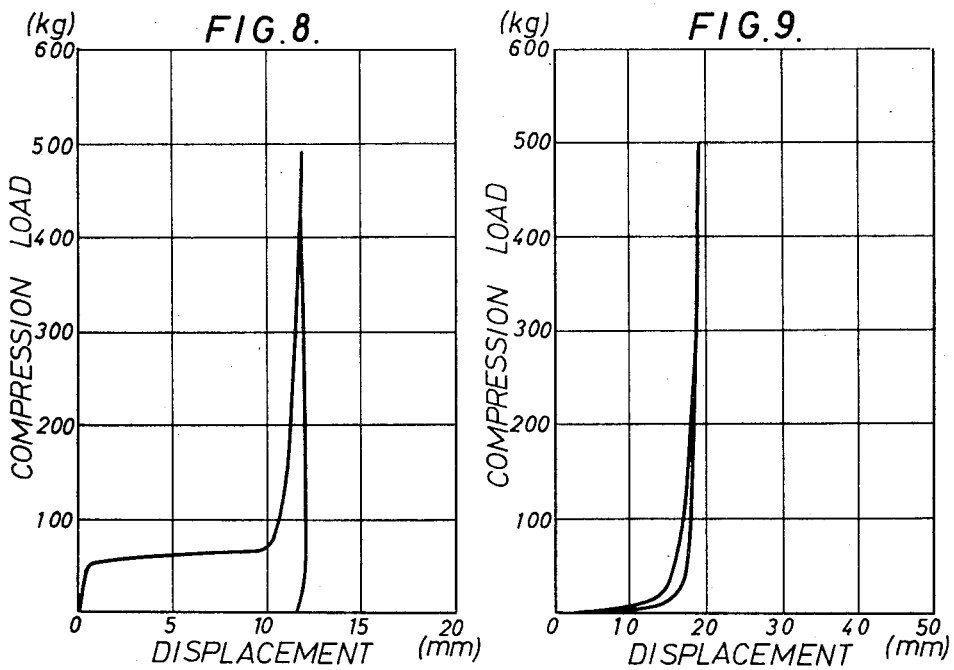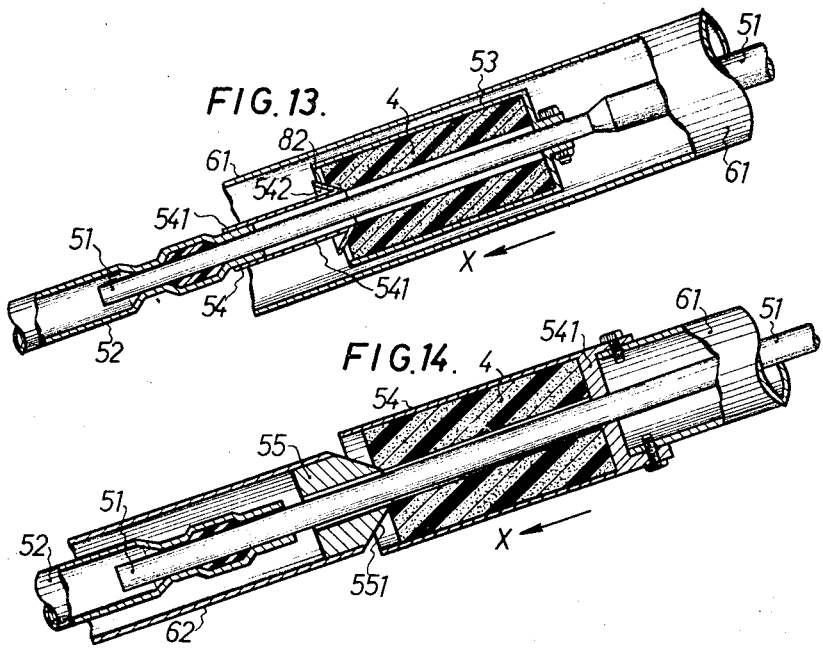

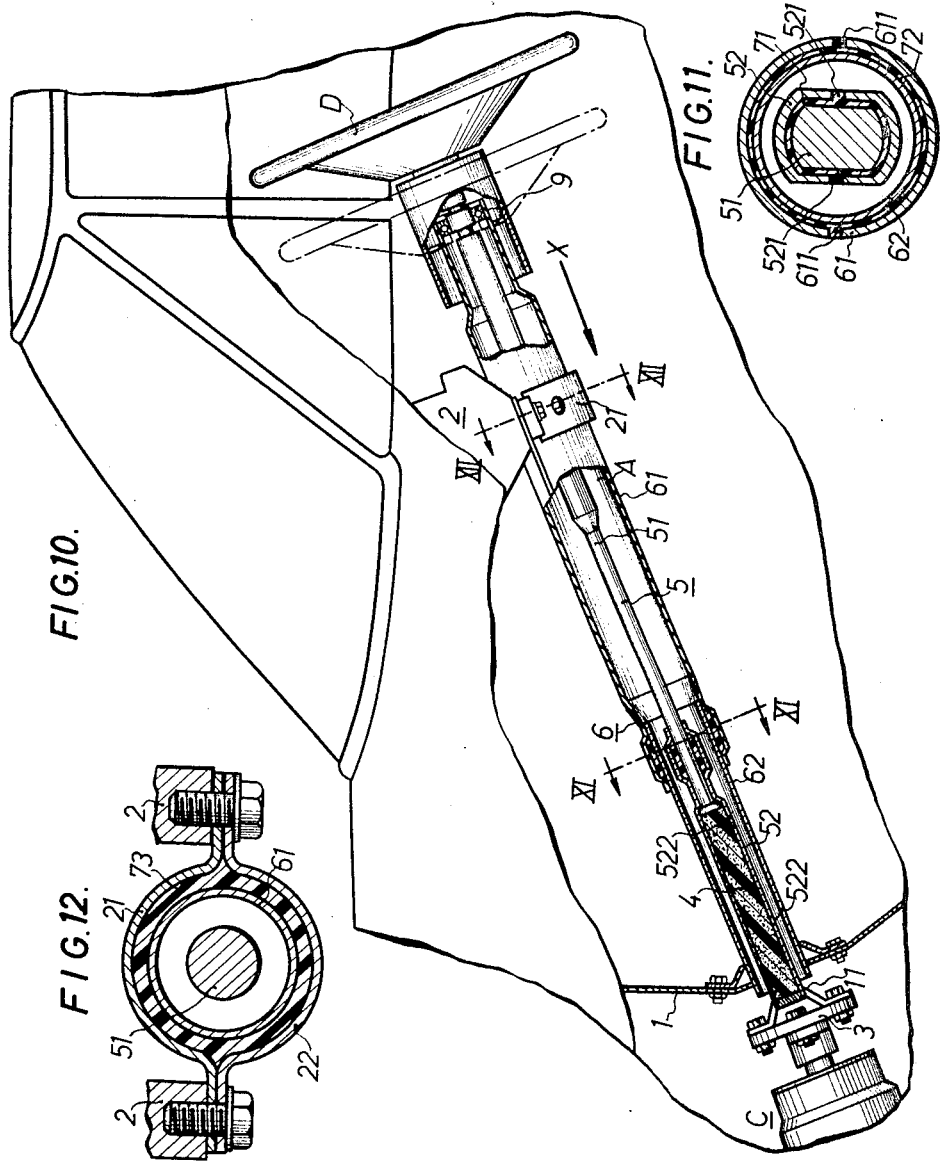

ENERGY ABSORBING STEERING DEVICE

BACKGROUND OF THE INVENTION

This invention relates to an energy absorbing steering device having a rigid plastic foam body as the energy absorbing material. The increased cruising velocity of automobiles and other vehicles has resulted in an increase in serious accidents involving substantial injuries to the drivers of such vehicles. Conventional steering devices are usually formed with a steering shaft rotatably supported in a steering column tube, said steering shaft being provided with a steering wheel on the end thereof. In such conventional steering devices, neither the steering shaft nor the steering column tube were axially displaceable, so that, when a vehicle is involved in an accident, the driver is thrown forwardly, so that his chest strikes with great force against said steering wheel. This problem is caused by the inertia of the cruising velocity of the vehicle. The impact of the driver against the steering wheel in such accidents causes serious injuries, and even death.

In order to protect drivers from such injuries, constructions have been proposed wherein the kinetic energy of the driver is absorbed by providing an axially displaceable steering shaft and steering column tube. In such constructions, the steering device is axially displaced when the driver collides against the steering wheel. However, a completely effective energy absorbing device of this type has not previously been produced, there being many problems in such prior art constructions involving the nature of the energy absorbing material, the mechanism for mounting said material, and the like which have not previously been solved. By providing a rigid plastic foam body intermediate axially displaceable upper and lower steering assemblies have been produced.

SUMMARY OF THE INVENTION

Generally speaking, in accordance with the invention, an energy absorbing steering device for interconnecting a steering wheel and a steering gear is provided having an upper steering assembly having said steering wheel mounted to the upper end thereof and a lower steering assembly having a steering gear coupled to the lower end thereof. Means are provided for connecting the lower end portion of said upper steering assembly and upper end portion of said lower steering assembly for relative axial displacement in response to the application of axial force on said assemblies, said connecting means permitting the transmission of rotational torque from said steering wheel through said upper and lower steering assemblies to said steering gear. A rigid plastic foam body is interposed between said upper and lower steering assemblies, said assemblies being adapted to compress said rigid plastic foam body therebetween upon said relative axial displacement to absorb said axial force.

Accordingly, it is an object of this invention to provide an energy absorbing steering device for minimizing the injury to a driver who impacts against the steering wheel of a vehicle.

Another object of the invention is to provide a steering device which can absorb a maximum amount of energy in a limited distance at a predetermined energy absorbing level.

A further object of the invention is to provide an energy absorbing steering device which is durable, stable in operation, relatively inexpensive, and simple in construction.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 2–9 show respective curves of load-displacement of various plastic foam materials;

FIG. 10 is a partially sectioned view of one embodiment of the steering device according to the invention.

FIGS. 11 and 12 are cross-sectional views taken along lines XI—XI and XII—XII respectively of FIG. 10;

FIG. 13 is a partially sectioned fragmentary view of a second embodiment of a steering device according to the invention; and FIG. 14 is a partially sectioned fragmentary view of a third embodiment of the steering device according to the invention.

DESCRIPTION OF THE PREFERRED EMBODIMENTS

Figure 1:
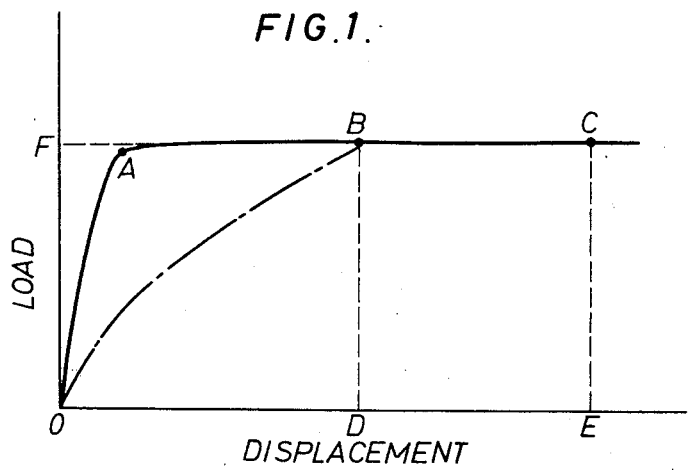
FIG. 1 shows the ideal curve of load-displacement of energy absorbing materials.

It is preferable that the load-displacement characteristics of an energy absorbing steering device, considering displacement in the direction that the shock is applied, be such that as much as possible of the kinetic energy of the driver be absorbed by the steering device within the limited displacement range, in order to minimize the shock applied to the driver. Accordingly, an ideal steering device would have load-displacement characteristics such that the load would sharply increase upon relatively small displacement during the initial period immediately after the application of the shock. Thereafter, in the ideal case, the load would not increase, but rather only the displacement would increase after said load reaches a predetermined level within the range at which the human body is not damaged, so that a great amount of kinetic energy is absorbed during this period. An ideal load-displacement curve is depicted in FIG. 1, wherein load defines the ordinate and displacement defines the abscissa. As shown in FIG. 1, when a shock load is applied, the load sharply rises up to the point A during an initial time interval within which there is little displacement. The load is not increased beyond a predetermined value F, which lies within the range at which damage to a human body is avoided. Beyond point A, only displacement increases, while load remains substantially level. The load F, which is maintained substantially level through said further displacement, is hereinafter referred to as a "plateau load," while the displacement during said level load is hereinafter referred to as a "plateau displacement." If the shock applied stops at the point B, the displacement is OD, and the kinetic energy absorbed during the displacement OD corresponds to the area encircled within OABD.

If the curve of load-displacement is as shown by dotted line OB in FIG. 1, the kinetic energy absorbed during the displacement OD corresponds to the area encircled within OBD, which is much smaller than that of the first-mentioned case. It is apparent from the above description that the ideal energy absorbing characteristics have a plateau load portion within a certain range of displacement, as in the case of OAB in FIG. 1. The larger said plateau load, the better the energy absorbing characteristics of the arrangement.

It has been found that rigid plastic foam materials have the ideal load displacement characteristics described above. The arrangement according to the invention provides a steering device which minimizes the shock against a driver through the use of a rigid plastic foam body as an energy absorbing material. According to the present invention, the steering device is plastically deformable in the compression direction upon the application of a shock load thereto, as when a driver impacts against a steering wheel. The energy absorbing characteristics of the material contributes to the avoidance of injury to the driver.

The following table sets forth the results of experiments conducted with various samples of column shaped plastic foam bodies. Each of said samples was compressed until the compressing load rached 500 Kg in the axial direction under a compression velocity of 50 mm/min. by means of an Instron type universal testing machine. The curve of compression-load displacement was obtained for each sample, as more particularly shown in FIGS. 2–9 which correspond respectively to samples 1–8.

| Sample number | Material | Density (g/cm³) | Size(mm) | Drawing number |
|---|---|---|---|---|
| 1 | rigid polyurethane foam | 0.11 | 40 φ × 50 | 2 |
| 2 | rigid polyurethane foam | 0.15 | 40 φ × 50 | 3 |
| 3 | rigid polyurethane foam | 0.11 | 30 φ × 18 | 4 |
| 4 | rigid polyurethane foam | 0.32 | 20 φ × 50 | 5 |
| 5 | rigid polyurethane foam | 0.48 | 20 φ × 50 | 6 |
| 6 | rigid styrene foam | 0.08 | 25 φ × 30 | 7 |
| 7 | rigid styrene foam | 0.029 | 40 φ × 13 | 8 |
| 8 | soft polyurethane foam | 0.19 | 40 φ × 20 | 9 |

Figure 2:
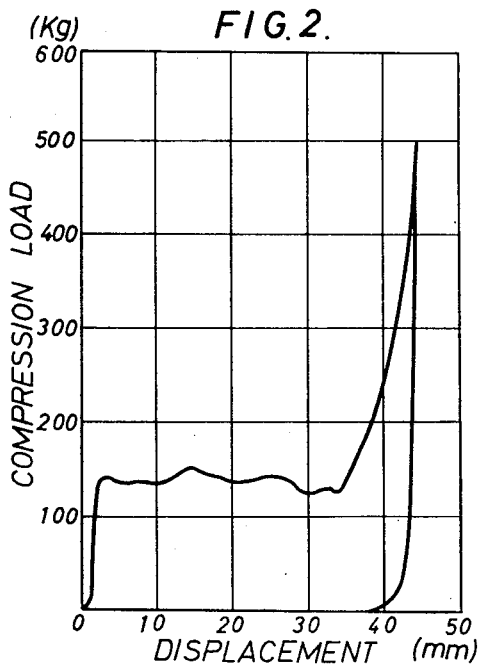
Figure 3:
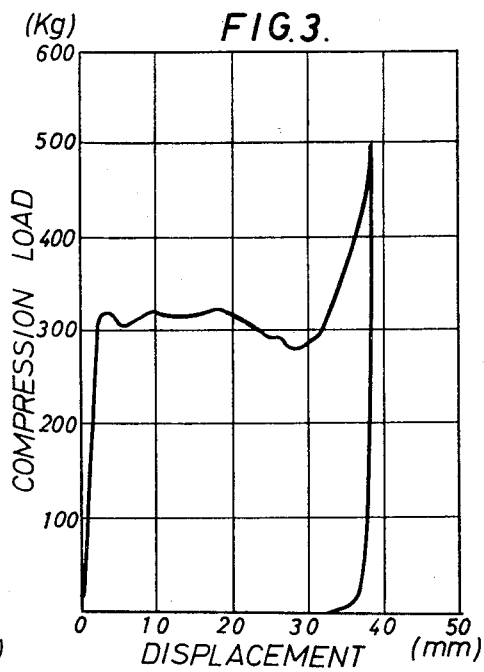

In the case of sample No. 1, as shown by the load-displacement curve of FIG. 2, the load rises sharply and almost linearly until the amount of displacement reaches about 3 mm. Thereafter, only the displacement increases, the plateau load being about 140 Kg. It is thus seen that the characteristic of the material of sample No. 1 is similar to the ideal characteristic depicted in FIG. 1, so that sample No. 1 is an effective energy absorbing material. The load rises suddenly near a displacement of 35 mm because the sample has reached the limit of plastic deformation at this point. In the case of samples 2–7, as in the case of sample No. 1, each load sharply rises during an initial period and then levels off to define a plateau load portion of the characteristic curve. Thus, each of the samples exhibit characteristics similar to the ideal of FIG. 1. In the case of sample No. 2 (FIG. 3), the plateau load is larger than that of sample No. 1. This increased plateau load is caused by the larger density of the foam material. Accordingly, the plateau load can be adjusted by selecting the density of the material.

While the material of sample No. 3 (FIG. 4) has a density identical to that of sample No. 1, both the plateau displacement and the plateau load of sample No. 3 are smaller than the corresponding characteristics of sample No. 1. The smaller plateau displacement of sample No. 3 is caused by the small height of said sample, while the smaller plateau load is caused by the smaller area to which a compression load is applied. Accordingly, plateau load can also be adjusted by means of selecting the cross sectional area of the body. The density of sample No. 4 (FIG. 5) is 0.32 g/cm³, which is larger than that of the above-mentioned samples, but its plateau load is smaller than that of sample No. 2. This is caused by the small area to which the compression load is applied.

Comparing sample No. 5 (FIG. 6) with sample No. 4, the density of sample No. 5 (0.48 g/cm³) is larger, as is its plateau load. The smaller plateau displacement is caused by the small range of plastic deformation caused by its large density.

Samples 6 (FIG. 7) and 7 (FIG. 8) are formed from styrene foam but have characteristics similar to those of the polyurethane foam. Both samples 6 and 7 have relatively small plateau loads due to their small density and area. Sample No. 8 (FIG. 9) is a soft polyurethane foam, as compared to the rigid plastic foam materials comprising sample Nos. 1–7. The characteristic curve of sample No. 8 includes neither the sharp initial rising of the load nor the following plateau load portion. Accordingly, said material cannot be used as an energy absorbing material for a steering device since the amount of kinetic energy absorbed thereby is very small.

Accordingly, rigid plastic foams have the characteristics of absorbing the maximum kinetic energy in a predetermined displacement range, and are ideally suited as energy absorbing materials. According to the present invention, a rigid plastic foam body is provided in a steering device as the energy absoring material. The rigid plastic cellular foam body is interposed between upper and lower steering assemblies which are adapted for relative axial displacement.

In the arrangement according to the invention, it is desirable that the plateau load, which is the load applied to a driver upon impact with a steering wheel during a collision, be as large as possible within the range of loads which will not injure the driver. Since the plateau load is mainly determined by the density of the plastic foam material utilized for energy absorbsion, if said density is too small, the plateau load is small and the amount of energy which may be absorbed is insufficient. On the other hand, if the density is too large, then the plateau load is too large and too large a force is applied to the driver after collision. Accordingly, the density of the rigid plastic foam material utilized for energy absorption in the steering device according to the invention is preferably between 0.1 g/cm³ and 0.6 g/cm³. When a material of the smaller density is employed, it is desirable that the cross sectional area of the rigid plastic foam energy absorbing body be relatively large. On the other hand, when a material having a larger density within said range is employed, an energy absorbing device effective even in the face of serious accidents is produced, since, although the shock applied to the driver due to impact with the steering wheel is relatively large but not large enough to injure the driver, the amount of kinetic energy absorbed is also large due to the large plateau load. On the other hand, sufficient displacement (compression) cannot be obtained in the case of high density foams, as shown in the characteristic curve of sample No. 5 (FIG. 6), so that the total amount of energy absorbed is limited. For this reason, it is necessary to use a shock absorbing body the length of which is relatively large in the compression direction, or to use a mechanism associated with said body by means of which sufficient displacement can be obtained for the determined length. Examples of such mechanisms are more particularly described below in connection with FIGS. 13 and 14.

Referring now to FIGS. 10–12, one embodiment of the energy absorbing steering device according to the invention is depicted. Said device consists of a steering shaft 5 having a steering wheel D mounted on one end thereof and a gear box C, containing the steering gear, connected to the other end thereof. Steering shaft 5 is mounted within a steering column tube 6. Said steering shaft consists of a rod-shaped upper shaft 51 having a substantially oval cross section and a pipe-shaped lower shaft 52. Steering wheel D is fixed at the upper end of upper shaft 51. The lower end portion of upper shaft 51 is engaged within the upper end portion of lower shaft 52. The coupling arrangement between said upper and lower shafts permits the relative axial displacement of said shafts but restricts relative rotary motion so that the steering torque and rotative displacement of the steering wheel D is transmitted to the steering gear within gear box C. The lower end of lower shaft 52 is blocked with a dust keeper 11 and connected to gearbox C through a universal joint 3. Steering torque is transferred to the front wheel of the vehicle through said gear box.

Steering column tube 6 consists of an upper tube 61, which is formed as an outer pipe surrounding upper shaft 51, and a lower tube 62 which is formed as an outer pipe surrounding lower shaft 52. The lower end of the upper tube 61 and the upper end of the lower tube 62 are inserted one within the other. The steering column tube 6 is secured to the car body through toe board 1 and dash board 2. Said steering column tube rotatably supports steering shaft 5 by means of a snap ring 9.

An upper steering assembly is thus defined consisting of upper shaft 51 and upper tube 61, while a lower steering assembly is defined by lower shaft 52 and lower tube 62. The coupling between said upper and lower steering assemblies is more particularly shown in FIG. 11. The overlapping portions between upper shaft 51 and lower shaft 52 is formed with a gap which is packed with plastic mold 71 which is inserted in said gap under pressure through hole 521 in said lower shaft. Similarly, the overlapping portions between upper tube 61 and lower tube 62 is formed with a gap which is packed with plastic mold 72, said plastic mold being inserted into said gap under pressure through a hole 611 in upper tube 61.

Under ordinary driving conditions, upper shaft 51 and lower shaft 52, and upper shaft 61 and lower tube 62 are respectively mutually coupled in the position depicted in FIG. 10. However, when a shock load is applied to steering wheel D, as by a driver's body during a collision of the vehicle, the coupling between upper shaft 51 and lower shaft 52 defined by plastic mold 71 is destroyed and the upper shaft 51 moves in the axial direction (X direction). Similarly, the coupling between upper tube 61, to which the axial force is also applied by steering wheel D, and lower tube 62 is also broken by destroying plastic mold 72, so as to permit the axial displacement of upper tube 61.

As more particularly shown in FIG. 12, upper tube 61 is mounted to dash board 2, and is secured thereto by clamps 21 and 22. A low frictional packing 73 is disposed between said clamps and said upper tube. Thus, when a shock load is applied by the driver to steering wheel D, said load is transmitted through said steering wheel to upper tube 61 and upper shaft 51 to cause the displacement of said upper tube and upper shaft.

A column shaped rigid plastic foam body 4 is positioned between the top end of the upper shaft 51 and dust keeper 11 within pipe-shaped lower shaft 52. Said body serves as an energy absorbing material. The diameter of said foam body is preferably such that a small gap is provided between the outer circumferential surface of said foam material and the inner circumferential surface of lower tube 62.

When an automobile provided with the steering device according to the invention is involved in a collision so that the driver engages against the steering wheel, the rigid plastic foam body 4 is compressed in the axial direction and is plastically deformed by engagement between upper shaft 51 and dust keeper 11. During such compression, air in the lower shaft 52 and in the rigid plastic foam body 4 escapes through a aperture 522 in lower shaft 52. Since the rigid plastic foam body has load-displacement characteristics as described above, the shock sharply rises just after a driver collides against the steering column D, but said shock load is not so great as to cause injury to the driver. After the initial shock load, the driver moves with the steering wheel in the axial direction of said steering shaft, said load being substantially maintained at said load plateau, as described above. During this process, a large amount of kinetic energy is absorbed and the driver is protected. In this manner, injury to the driver can be minimized, even if the steering shaft moves at the critical displacement of the rigid plastic foam material.

Referring now to FIG. 13, a second embodiment of the steering device according to the invention is depicted. Said embodiment is provided with an energy absorbing body of a predetermined compression direction length selected for maximum displacement. The portions of the steering device other than those depicted in FIG. 13 are identical with the corresponding portions of the embodiment of FIGS. 10–12. Said second embodiment is provided with a cylindrical casing 53 which is fixed concentrically to an upper shaft 51 of the steering shaft. A thick cylindrically shaped rigid plastic foam body 4 having an outer diameter nearly equal to the inner diameter of said cylindrical casing 63 is inserted within said cylindrical casing. Said rigid plastic foam body is provided with a central bore therethrough, upper shaft 51 extending through said bore. A foam pressing member 54 is mounted on the outer circumferential surface of lower shaft 52 in the region of its coupling with upper shaft 51. Said foam pressing member is formed of a cylindrically shaped base 542 secured to lower shaft 52 and a pyramid-shaped pressing portion 542 formed by bending outwardly the top end of said base 541. The rigid plastic foam body 4 is engaged by surface 82 of pyramid-shaped pressing surface 542 and supported and held in cylindrical casing 53 by said pressing member. The diameter of the outer edge of pressing portion 542 is formed so as to be slightly smaller than the inner diameter of cylindrical casing 53.

Since foam body 4 is held as described above, when upper shaft 51 and foam body 4 are displaced together in the axial direction (X direction) by the impact of the driver against the steering wheel, surface 82 of pressing member 54 is pushed into the cylindrical casing 53 to compress the foam 4. The compressed and destroyed foam body 4 is displaced in the circumferential direction by pressing surface 82 so that the end point of said pressing surface can engage the end wall surface of cylindrical casing 53 at the end of the axial displacement of upper shaft 51 and upper tube 61. In this manner, the embodiment of FIG. 13 is adapted to effectively absorb the maximum kinetic energy.

Referring now to FIG. 14, a third embodiment of the steering device according to the invention is depicted. In said embodiment, a cylindrical casing 54 is secured to upper tube 61 of the steering column tube. Cylindrical casing 54 is formed with a bottom portion 541 formed with a central aperture therethrough, through which upper shaft 51 extends. A fixed cylindrically shaped rigid plastic foam body 4 is mounted within cylindrical casing 54. The outer diameter of said foam body is nearly equal to the inner diameter of said cylindrical casing, said foam body being formed with a central bore therethrough, said upper shaft extending through said bore. Lower tube 62 is formed with an outer diameter smaller than the inner diameter of cylindrical casing 54, said lower tube being dimensioned to permit the steering shaft to extend therethrough. A pressing member 55 is mounted at the top end of lower tube 62 in facing relation to cylindrical casing 54. Said pressing member has an axial bore therethrough and is formed with a conically shaped pressing surface 551 at the end thereof facing said cylindrical casing.

The pointed end portion of pressing surface 551 forms one end of foam body 4. When the steering wheel moves in the axial direction (X direction) in response to the impact thereon of the driver, then upper tube 61 and shaft 51 are displaced in said axial direction. Upper tube 61 carries with it cylindrical casing 54 so that pressing surface 551 of pressing member 55, which is fixed to lower tube 62, is pushed into said cylindrical casing. The compressed and destroyed portions of foam body 4 are displaced in the circumferential direction as pressing surface 551 is engaged thereagainst. The maximum stroke occurs when the end point of the pressing surface engages bottom surface 541 of the cylindrical housing. Thus, the embodiment of FIG. 14, like the embodiment of FIG. 13, is effective to absorb the maximum kinetic energy.

In summary, the present invention relates to a steering device in which a rigid plastic foam body, having load displacing characteristics adapted to absorb the maximum kinetic energy in a predetermined displacement range, is employed as an energy absorbing member. The arrangement according to the invention provides an effective means to protect drivers of vehicles involved in accidents.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An energy absorbing steering device for interconnecting a steering wheel and a steering gear comprising an upper steering assembly having said steering wheel mounted to the upper end thereof; a lower steering assembly having a steering gear coupled to the lower end thereof; means for connecting the lower end portion of said upper steering assembly and the upper end portion of said lower steering assembly for relative axial displacement in response to the application of axial force on said assemblies, said connecting means permitting the transmission of rotational torque from said steering wheel through said upper and lower steering assemblies to said steering gear; one of said upper and lower steering assemblies including a cylinder member having one open end and one closed end defined by a bottom plate and the other of said assemblies including a piston having a pushing surface inclined relative to the axis of said cylinder member and a smaller outer diameter than the inner diameter of said cylinder member, said piston being normally partially inserted into said cylinder member; and a rigid plastic foam body being disposed in said cylinder intermediate said inclined pushing surface of said piston and said bottom plate of said cylinder member, said inclined pushing surface projecting toward said rigid plastic foam, said assemblies being adapted to compress said rigid plastic foam body therebetween upon said relative axial displacement to absorb said axial force.

2. An energy absorbing steering device according to claim 1, wherein said rigid plastic foam body is formed of a material selected from the group consisting of rigid polyurethane foam and rigid polystyrene foam.

3. An energy absorbing steering device according to claim 1, wherein said rigid plastic foam body is formed of a material having a density lying within the range from about 0.10 to 0.60 gr/cm$^3$.

4. An energy absorbing steering device according to claim 1, wherein the end surface of said piston facing said rigid plastic foam body is formed with a substantially conical surface having the apex thereof projecting toward said foam body.

5. An energy absorbing steering device according to claim 1, wherein said upper steering assembly includes an upper steering shaft and said lower steering assembly includes a lower steering shaft, one of said upper and lower steering shafts being formed as a pipe having one open end, the adjacent portion of the other of said steering shafts being inserted into said pipe-shaped steering shaft.

6. An energy absorbing steering device according to claim 5, wherein said connecting means includes said upper and lower steering shafts being formed with a gap therebetween in the overlapping regions thereof between the inner surface of said pipe-shaped steering shaft and the outer surface of the other of said steering shaft, said connecting means including plastic disposed within said gap.

7. An energy absorbing steering device according to claim 6, wherein said pipe-shaped steering shaft has a substantially non-circular section, and the other of said steering shafts has a corresponding section for the transmission of rotary torque therebetween.

8. An energy absorbing steering device according to claim 5, wherein said cylinder member is fixed to one of said upper and lower steering shafts, and said piston is fixed to the other of said steering shafts.

9. An energy absorbing steering device according to claim 8, wherein said bottom plate of said cylinder is formed with an aperture therethrough aligned with the axis of said steering shafts, one of said upper and lower steering shafts extending through said aperture and being fixed to said cylinder at said aperture, said piston having a bore therethrough aligned with the axis of said steering shafts, the other of said upper and lower steering shafts extending through said bore and being fixed to said piston at said bore, said rigid plastic foam body being cylindrically shaped and formed with an axial bore therethrough, said rigid plastic foam body being positioned within said cylinder member with the one of said steering shafts extending through said aperture in said cylinder member bottom plate also extending through said foam body bore.

10. An energy absorbing steering device according to claim 9, wherein the end surface of said piston facing said cylinder is formed with a conical surface about said bore, the apex of said conical surface projecting toward said cylinder member.

11. An energy absorbing steering device according to claim 9, wherein said pipe-shaped steering shaft is said lower steering shaft.

12. An energy absorbing steering device according to claim 11, wherein said piston is fixed on said pipe-shaped lower steering shaft.

13. An energy absorbing steering device according to claim 9, wherein said rigid plastic foam body is formed of a material having a density lying in the range from 0.1 to 0.6 gr/cm³.

14. An energy absorbing steering device according to claim 13, wherein said rigid plastic foam body is formed of a material selected from the group consisting of rigid polyurethane foam and rigid polystyrene foam.

15. An energy absorbing steering device according to claim 5, wherein said cylinder member is said pipe-shaped steering shaft, the bottom plate of said cylinder member defining a bottom plate in said pipe-shaped steering shaft, said piston being the other of said steering shafts, the end of said other of said steering shafts inserted within said pipe-shaped steering shaft having a conical pushing surface projecting toward said bottom plate.

16. An energy absorbing steering device according to claim 15, wherein said pipe-shaped steering shaft is said lower steering shaft.

17. An energy absorbing steering device according to claim 15, wherein said rigid plastic foam body is formed of a material having a density lying within a range from about 0.1 to 0.6 gr/cm³.

18. An energy absorbing steering device according to claim 17, wherein said rigid plastic foam body is formed of a material selected from the group consisting of rigid polyurethane foam and rigid polystyrene foam.

19. An energy absorbing steering device according to claim 5, wherein said upper steering assembly includes an upper steering column tube positioned about said upper steering shaft and said lower steering assembly includes a lower steering column tube positioned about said lower steering shaft, said upper steering shaft being mounted within said upper steering column so as to permit relative rotation of said upper steering shaft; said device including a vehicle body, said lower steering column tube being fixed to said vehicle body, one of said piston and cylinder member being fixed on said upper steering column tube, the other of said piston and cylinder member being fixed on said lower steering column tube.

20. An energy absorbing steering device according to claim 19, wherein said cylinder member and piston are each respectively fixed coaxially to the respective steering column tube, said cylinder member bottom plate and said piston each having an axially aligned aperture therethrough, at least one of said upper and lower steering shafts extending through each of said apertures, said rigid plastic foam body being cylindrically shaped with an axial bore therethrough, said foam body being positioned in said cylinder member with at least one of said upper and lower steering shafts extending through the bore thereof intermediate said piston and said cylinder member bottom plate.

21. An energy absorbing steering device according to claim 20, wherein the end of said piston facing said cylinder is formed with a conical surface about the axial aperture therethrough, the apex of said conical surface projecting toward said cylinder.

22. An energy absorbing steering device according to claim 21, wherein said cylinder member is fixed on said upper steering column tube and said piston is fixed on said lower steering column tube.

23. An energy absorbing steering device according to claim 20, wherein said rigid plastic foam body is formed of a material having a density lying in the range from about 0.1 to 0.6 gr/cm³.

24. An energy absorbing steering device according to claim 23, wherein said rigid plastic foam body is formed of a material selected from the group consisting of rigid polyurethane foam and polystyrene foam.

* * * * *